June 7, 1932.   W. DUBILIER   1,862,302

ELECTRICAL CONDENSER

Filed Sept. 21, 1929

William Dubilier
INVENTOR

BY *H F Presson*
ATTORNEY

Patented June 7, 1932

1,862,302

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRICAL CONDENSER

Application filed September 21, 1929. Serial No. 394,295.

In the construction of electrical condensers, particularly those which are intended to operate at high voltages and with high applied radio frequencies, difficulties are often experienced in arranging the parts of the condenser so as to avoid excessive heating of those parts due to dielectric losses and eddy currents in metal parts forming the structure of the condenser.

The object of this invention is to provide improved means of constructing such condensers and particularly such condensers when they are made in the form of structures built up from a plurality of small condenser units. The invention relates also to the construction of such units for building up larger condenser structures, so that the individual units will be electrically efficient and so adapted as to be readily built into larger structures.

Figure 1:
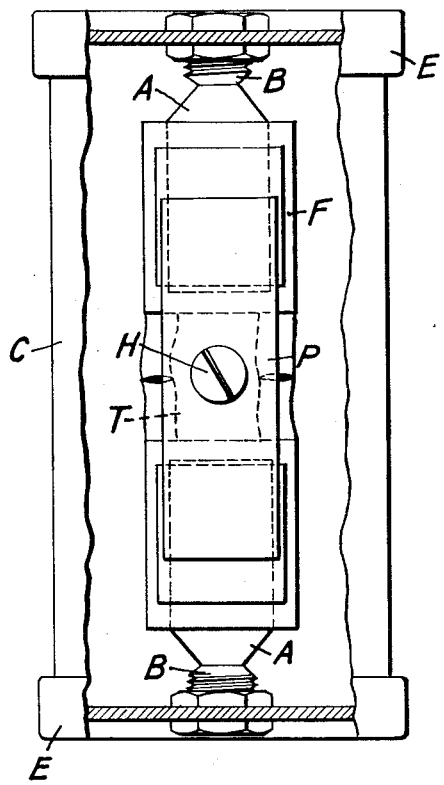
Figure 2:
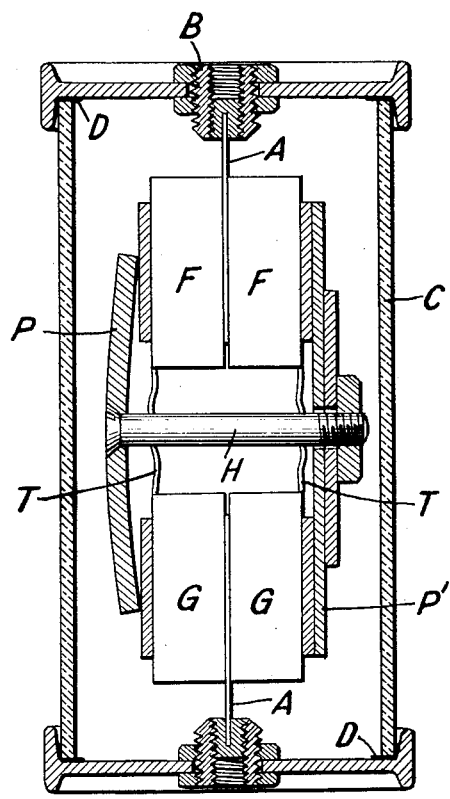

Fig. 1 is a view of a condenser constructed in accordance with the principles of my invention, with the casing broken away to show the interior construction, and Fig. 2 is another view, partly in section, of the interior arrangement of the condenser.

The invention preferably utilizes a construction of a condenser unit which is entirely enclosed within an insulating container provided with metal end caps or terminal plates. The insulating portion of the container may be cylindrical or rectangular in form, as preferred, and the metal end caps which act as terminals for the condenser serve also as closures for the insulating container. Suspended within the interior of this insulating container the condenser elements are secured between the said conducting terminal end closures. Preferably the condenser element is constructed of a plurality of elementary condensers built up in well-known manner with interleaved dielectric and conducting foils which may be connected to each other in parallel, or in series, or in multiple series parallel connections, in order to provide any desired capacity relationship for the complete condenser.

In order to facilitate the assembly of these condenser elements within the insulating container they are arranged preferably in two groups which are secured and clamped together by means of common clamping plates, which can act also as electrical conductors between the two portions of the condenser unit. These two portions are arranged adjacent to the end terminal closures of the insulating container and connected thereto, so that the complete condenser unit consists essentially of two portions of condenser elements connected electrically in series within it.

A preferred form of the invention is shown diagrammatically in the drawing, in which C represents a tubular form of the insulating container provided with the metallic end caps or closures E, E. Between the said closures and the ends of the tubular insulating member C resilient gaskets D, D, of cork, or rubber, or similar resilient material are inserted in order to distribute any pressure or strain by the said metal end closure plates and also to seal the interior of the container C from access of moist air et cetera. Within the container C the condenser blocks F, F, and G, G, are disposed, these being clamped together between the common clamping members P, P', between which pressure is applied by means of the bolt H passing between them. The condenser blocks F, F, and G, G, are thus rigidly held together and form a complete unit structure which is mounted between the end closure members E, E, by means of the conducting strips A, A, which are provided with threaded extensions screwing into the bosses B, B, in the closure plates E, E. When required additional conducting meal strips T, T, can be soldered between the condenser blocks F, F, and G, G, to provide definite electrical connection between those condenser blocks independently of the contact provided by the clamping plates P, P'. Between the terminal plates E, E, two condenser blocks are thus established in series and two in parallel. Thus, from the upper terminal closure member E the current passes through the conducting trip A into the centre of the condenser block F, F, wherein it divides into two paths flowing through these condenser blocks and through the conducting strips T, T, to the outside conductors of the condenser blocks G, G, thence through these two blocks in parallel re-uniting at the lower terminal strip A and then passing to the lower terminal member E.

Each of the condenser blocks F, F, and G, G, can be constructed in well-known manner with interleaving dielectric and conducting materials and may if required consist of a plurality of condenser elements or sections electrically connected together in series or parallel as required. Further, each of these condenser elements may be provided with intermediate or floating conductors between the dielectric sheets as is especially desirable when the condensers are intended for use in circuits operating at very high radio frequencies.

The clamping members P, P', in the diagram are preferably arranged to be constructed of resilient or springy material, so that pressure is permanently maintained between the end faces of the condenser blocks F, F, and G, G.

It will be noted in the drawing with special reference to Fig. 2 that the condenser structure holds the caps E, E against the container C. The pressure on the gaskets D, D may be adjusted by setting the nuts on bosses B, B which are inside the container a distance apart which is slightly less than the length of container C. The tightening of the other nut on bosses B, B, which are outside of the container will then create a tensile stress in the condenser structure and create a desired degree of pressure between caps E, E and container C to properly seal the same by means of gasket D, D.

The threaded bosses B, B provide a ready means for connecting several condenser units of the type shown in the drawing either in series or in parallel, for instance, by connecting means adapted to screw into the basses B, B.

It is understood that the said insulating container C may be constructed of a variety of insulating materials depending upon the use to which the condenser is to be applied and particularly when the condenser is needed for use in circuits operating at very high radio frequencies, the said insulating container would be constructed of a special glass, quartz, or other similar insulating material which has the minimum electrical losses needed when used under such high frequency conditions.

When the container C is of glass or other insulating material which is most readily made in simple forms and which is with difficulty machined or provided with holes, etc., the construction shown in the drawing is particularly desirable in that the force holding the end plates or caps E, E on the container is exerted by the condenser structure. The construction shown does not require bolted, threaded or cemented joints such as are ordinarily used.

The container also may be filled with wax, or other insulating material or compound to assist in the insulation of the condenser elements and in the exclusion of air and moisture.

I claim:

1. An electrical condenser comprising a plurality of pairs of oppositely disposed stacks of interleaved armature and dielectric elements enclosed in a container, the said stacks being held together and maintained under compression by common clamping means within the container and terminals for the condenser clamped between different pairs of oppositely disposed stacks.

2. An electrical condenser as claimed in claim 1 having independent conducting means between the groups of condenser elements.

3. An electrical condenser as claimed in claim 1, the said container being of insulating material and having metal end caps mechanically and electrically connected to said terminals.

4. An electrical condenser as claimed in claim 1 having metallic closure plates for the container, the condenser element being mounted and suspended between the closure plates by the terminals of the condenser.

5. An electrical condenser or condenser unit as claimed in claim 1, having metallic closure members for the container, the condenser elements being suspended by conducting strips having threaded extensions screwed into bosses on the said closure members.

6. An electrical condenser adapted for use in radio frequency circuits, comprising a plurality of pairs of oppositely disposed stacks of interleaved armature and dielectric elements enclosed in a container, the said stacks being held together and maintained under compression by a clamp within the container, the terminals of the condenser being connected to the adjacent ends of pairs of oppositely disposed stacks, the clamp contacting with the opposite ends of the pairs of stacks to prevent the inducing of eddy currents in the clamp.

7. An electrical condenser adapted for use in radio frequency circuits, comprising a plurality of pairs of oppositely disposed stacks of interleaved armature and dielectric elements enclosed in an open ended casing of insulation, the said stacks being held together and compressed by a clamp within the casing, the terminals of the condenser being connected to the adjacent ends of pairs of oppositely disposed stacks, the clamp contacting with the opposite ends of the pairs of stacks to prevent the inducing of eddy currents in the clamp, metal end closure plates for the casing having the terminals connected thereto to connect the condenser in circuit, said end plates having means for mechanically and electrically connecting the condenser to the end plate of a similar unit whereby a plurality of such units may be built up into a single structure.

8. An electrical condenser comprising a tubular insulating container, a condenser unit comprising interleaved armature and dielectric elements disposed therein, metallic terminals secured to opposite ends of said condenser unit, and a metallic cap on each end of said container, said caps being secured to the respective terminals and held against the container by the terminals.

9. An electrical condenser comprising a tubular insulating container, metallic caps on the ends of said container, a pair of condenser units each comprising interleaved armature and dielectric elements disposed in each end of said container, a metallic terminal for each pair of condenser units clamped therebetween and mechanically and electrically connected to one of said caps, and a clamping member connecting said pairs of condenser units adapted to exert pressure thereon and electrically connecting said pairs of condenser units in series.

WILLIAM DUBILIER.